May 10, 1960
C. C. MORGAN, JR
2,935,874
BOUNDARY LAYER HEAT TRANSFER CALORIMETER
Filed Aug. 15, 1958
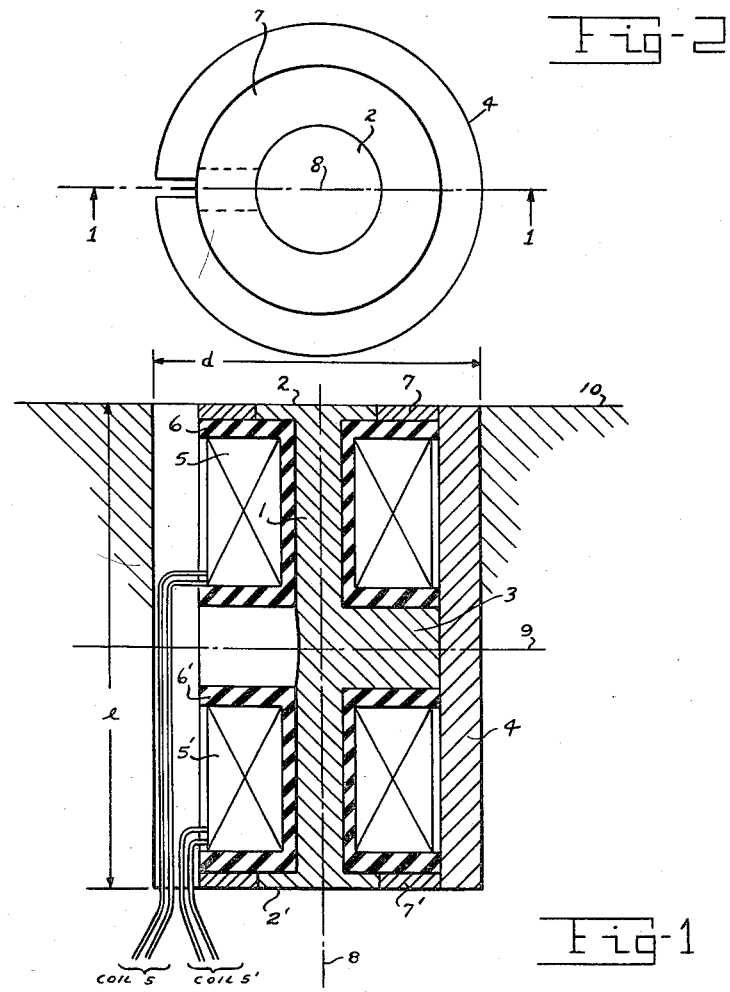
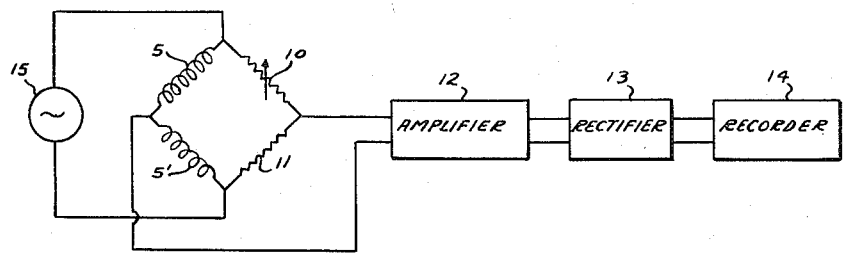
INVENTOR.
CHARLES C. MORGAN, JR.
BY
ATTORNEY
AGENT

United States Patent Office 2,935,874
Patented May 10, 1960

2,935,874

BOUNDARY LAYER HEAT TRANSFER COLORIMETER

Charles C. Morgan, Jr., Beersheba Springs, Tenn.

Application August 15, 1958, Serial No. 755,357

6 Claims. (Cl. 73—362)

It is the purpose of this invention to provide a heat transfer calorimeter particularly suited to the measurement of heat transfer between the boundary layer of a fluid and the surface of a body in relative motion at hypersonic speeds. The sensing element of the device is mounted flush with the surface of the body so as to prevent aerodynamic disturbance. The device is applicable to actual aircraft and missiles or to their wind tunnel models, the small size in which the sensing element can be constructed particularly suiting the device to the latter use. Additional features of the device are its design to prevent spurious response to nearby electrical currents of high power and its insensitivity to ambient temperature changes.

The calorimeter will be described in more detail in connection with the specific embodiment thereof shown in the accompanying drawing in which—

Fig. 1 is a cross section of the sensing element of the calorimeter

Fig. 2 is an end view of the sensing element, and

Fig. 3 illustrates the electrical circuit of the calorimeter.

Referring to Figs. 1 and 2, the sensing element of the calorimeter comprises an inner cylindrical core 1 of magnetic material having similar end portions 2 and 2' of enlarged diameter and an enlarged center portion 3 having a diameter equal to the inside diameter of a surrounding concentric cylindrical core 4 of magnetic material. Similar coils 5 and 5' wound on bobbins 6 and 6' surround the inner core in the spaces between the enlarged center portion 3 and the enlarged end portions 2 and 2'. The bobbins are made of a suitable insulating material such as nylon and may be made in halves or split sufficiently to permit their assembly over the center core. The spaces between the end portions 2 and 2' and the outer core 4 are occupied by two identical conductive rings 7 and 7' of known thermal mass or specific heat. The device may be constructed in small size, representative dimensions being $d=.250''$ and $l=.375''$ with the other dimensions in proportion. The coils 5 and 5' may, for example, consist of 140 turns of #34 enamel wire 10 layers deep. As is evident from the drawing, the sensing element is dimensionally symmetrical with respect to both the longitudinal axis 8 and a transverse axis 9 intersecting axis 8. It is normally mounted so that one end is flush with the body surface 10 in contact with the fluid boundary layer.

As seen in the drawing the sensing element consists of two identical magnetic circuits, one situated above axis 9 and the other below this axis in mirror symmetry. An alternating current in coil 5 causes an alternating flux to flow in the magnetic circuit consisting of the upper half of core 1, end portion 2, the air gap between end portion 2 and the upper end of outer core 4, the upper half portion of outer core 4 and center portion 3 of the inner core. Since conductive ring 7 is located in the air gap, it is linked by the flux in the gap with the result that a voltage is induced in the ring and a corresponding current is caused to flow in the ring. In effect, therefore, ring 7 is the closed secondary winding of a transformer of which coil 1 is the primary winding. An identical transformer with coil 5' and ring 7' as the primary and closed secondary windings comprises the lower half of the sensing element. Both the outer core 4 and the enlarged portion 3 of the inner core are longitudinally slotted to block the flow of induced currents in the cores.

It is a known property of a transformer with a closed secondary circuit that an impedance is coupled from the secondary circuit into the primary circuit due the mutual inductance of the two windings. Therefore, the impedance of the secondary circuit influences the terminal impedance of the primary winding and a change in the secondary circuit impedance will produce a change in this terminal impedance. This is the principle on which the operation of the calorimeter sensing unit is based. The rings 7 and 7' constitute the closed secondary circuits of the two transformers and the terminal impedences of primary windings 5 and 5' are therefore functions of the ring impedances. Since the electrical resistances of the conductive rings are functions of their temperatures, their impedances and also the terminal impedances of windings 5 and 5' are functions of their temperatures. Rings 7 and 7' may be made of copper and are as nearly identical as it is possible to make them.

In practice, as shown in Fig. 3, the coils 5 and 5' are connected as adjacent legs of a bridge circuit having resistors 10 and 11 as the other legs. The bridge is energized across one diagonal from source 15 at, for example, a potential of 2.5 volts and a frequency of 20,000 c./s. The voltage appearing across the other diagonal is amplified by amplifier 12, converted to a proportional direct current by rectifier 13 and applied to recorder 14. These elements may be of any conventional suitable type.

Since the two halves of the sensing unit of Fig. 1 are as near identical as possible the terminal impedance of windings 5 and 5' will be equal, or nearly equal, when rings 7 and 7' are at the same temperature. Therefore, the bridge will be balanced when resistors 10 and 11 are equal or substantially so. Resistor 10 is made variable so as to compensate for any slight electrical difference that may exist in the two halves of the sensing unit.

The bridge will remain in balance and no signal will be applied to the input of ampifier 12 in the absence of heat transfer between the boundary layer of the fluid and ring 7 in contact therewith. Changes in ambient temperature will affect both conductive rings alike, and therefore will not unbalance the bridge. Also, any stray fields, such as from nearby electrical power equipment, to which the sensing unit may be subjected will link both coils alike and produce equal changes in terminal voltage which will not unbalance the bridge. In the presence of heat transfer between the boundary layer and ring 7 there will be a difference in the temperatures of the two rings causing a difference in the terminal impedances of coils 5 and 5' and an output from the bridge that is a direct function of the temperature difference.

Calibration of the instrument involves determining the specific heat of the ring material and calibration of the device as a thermometer. The former can be accomplished by usual laboratory methods. The latter may be done statically by presenting ring 7 to the surface of a material of high thermal conductivity and high electrical resistance such as pure water of which the temperature is known. With the specific heat of the ring material known and its rate of temperature change measurable, the rate of heat transfer can be determined.

I claim:

1. A calorimeter for measuring the heat transfer between the boundary layer of a fluid and a surface in relative motion, said calorimeter comprising: a first conductive ring of known thermal mass and having a resistance that is a function of temperature located in said surface, a first coil inductively coupled to said first ring, a second conductive ring identical to said first ring situated beneath said surface, a second coil inductively coupled to said second ring, a bridge circuit containing said two coils as adjacent legs, means for applying alternating current energization across one diagonal of said bridge circuit, and means for indicating an alternating voltage across the other diagonal of said bridge.

2. A calorimeter for measuring the heat transfer between the boundary layer of a fluid and a surface in relative motion, said calorimeter comprising: a first conductive ring of known thermal mass and having a resistance that is a function of temperature located flush with said surface, a first coil located beneath said surface and inductively coupled to said first ring, a second conductive ring identical to said first ring situated out of contact with said boundary layer but subject to ambient temperature, a second coil inductively coupled to said second ring, a bridge circuit containing said two coils as adjacent legs, means for applying alternating current energization across one diagonal of said bridge circuit, and means for indicating an alternating voltage across the other diagonal of said bridge circuit.

3. A calorimeter for measuring the heat transfer between the boundary layer of a fluid and a surface in relative motion, said calorimeter comprising: a first conductive ring of known thermal mass and having a resistance that is a function of temperature located flush with said surface, a first coil located beneath said surface and inductively coupled to said first ring, a second conductive ring identical to said first ring situated out of contact with said boundary layer but subject to ambient temperature, a second coil inductively coupled to said second ring, a bridge circuit containing said two coils as adjacent legs, means for applying alternating current energization across one diagonal of said bridge circuit, and means for indicating an alternating voltage across the other diagonal of said bridge circuit.

4. A calorimeter for measuring the heat transfer between the boundary layer of a fluid and a surface in relative motion, said calorimeter comprising: a pair of identical conductive rings of known thermal mass and having resistances that vary with temperature, said rings being spaced and centered with respect to an axis normal to their planes and to said surface, one of said rings being flush with said surface and in contact with said boundary layer and the other lying beneath said surface and out of contact with said boundary layer but exposed to ambient temperature; a pair of coils situated between said rings and wound about said axis as a center; means establishing inductive coupling between one of said coils and one of said rings, and similar means establishing a similar inductive coupling between the other of said coils and the other of said rings; a bridge circuit containing said pair of coils as adjacent legs; means for applying alternating current energization across one diagonal of said bridge circuit; and means for indicating an alternating voltage across the other diagonal of said bridge circuit.

5. A heat transfer sensing element comprising: an elongated cylindrical magnetic core having a center section of increased diameter and end sections of lesser increased diameter; a longitudinally split cylindrical magnetic shell concentric with the axis of said core, coextensive with said core and having an inside diameter equal to the diameter of said center section; similar conductive rings of known thermal mass and having resistances that vary with temperature filling the spaces between said end sections and said shell; and a pair of similar coils wound about said core in the spaces between said center section and said end sections.

6. A calorimeter for measuring the heat transfer between the boundary layer of a fluid and a surface in relative motion, said calorimeter comprising: a sensing element as claimed in claim 5 arranged beneath said surface with one of said conductive rings flush with said surface, a bridge circuit containing said coils as adjacent legs, means for applying alternating current energization across one diagonal of said bridge circuit, and means for indicating an alternating voltage across the other diagonal of said bridge circuit.

References Cited in the file of this patent

UNITED STATES PATENTS

| | | |
|---|---|---|
| 2,104,646 | Greenslade | Jan. 4, 1938 |
| 2,350,329 | Hornfeck | June 6, 1944 |
| 2,540,588 | Long | Feb. 6, 1951 |